Figure 1:
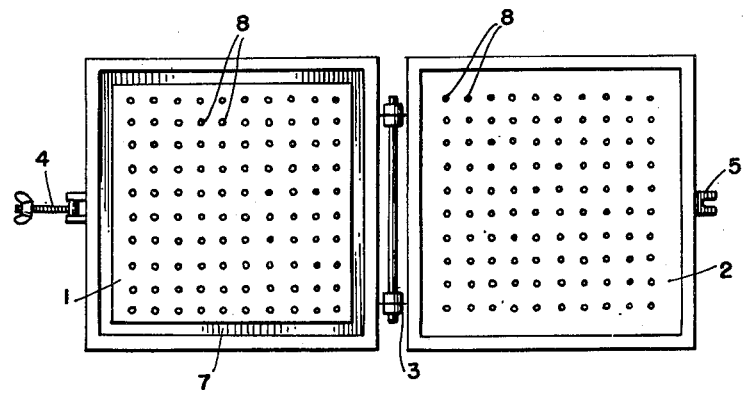

Jan. 29, 1957 F. STASTNY 2,779,062
PRODUCTION OF POROUS SHAPED ARTICLES TRUE TO
SHAPE AND SIZE FROM SYNTHETIC
THERMOPLASTIC MATERIALS
Filed April 16, 1952

*INVENTOR:*
FRITZ STASTNY
BY Margace, Johnston
Cook & Root
ATT'YS

2,779,062

PRODUCTION OF POROUS SHAPED ARTICLES TRUE TO SHAPE AND SIZE FROM SYNTHETIC THERMOPLASTIC MATERIALS

Fritz Stastny, Weinheim an der Bergstrasse, Germany, assignor to Badische Anilin- & Soda-Fabrik Aktiengesellschaft, Ludwigshafen (Rhine), Germany Application April 16, 1952, Serial No. 282,682

Claims priority, application Germany April 26, 1951

7 Claims. (Cl. 18—48)

This invention relates to the production of porous shaped articles which are true to shape and size by heating comminuted gas-containing thermoplastic substances in moulds to temperatures above the softening point of the thermoplastic substances.

It is already known to prepare porous shaped articles from synthetic thermoplastic substances and raising agents, i. e. compounds which when heated decompose with the formation of gas. For this purpose the comminuted thermoplastic substance is mixed with the raising agent and pressed into the shaped articles in gastight moulds by heating to the softening temperature of the thermoplastic substance, the decomposition of the raising agent thus taking place at the same time. These shaped articles are, after cooling, removed from the moulds and again heated to the softening point. In this way the gases formed by the decomposition of the raising agent, which are under pressure, form the porous article. It is possible to prepare articles of relatively simple shape, as for example plates, balls and the like, by this method. It is not satisfactory, however, when it is desired to produce complicated shaped articles, as for example dolls or animal figures, because when such pressed articles are "foamed up" irregular changes of shape take place.

I have now found that porous shaped articles of any shape and size, which are true to shape and size (i. e. which retain their proportion) can be prepared by heating comminuted synthetic thermoplastic substances which contain gases under pressure to temperatures above the softening point of the thermoplastic substance in moulds. Contrary to expectation a rapid formation of true-to-shape shaped articles is obtained in particular by foaming-up the gas-containing particles of thermoplastic substances in liquids which do not dissolve the thermoplastic substance or in liquid vapors which do not attack the thermoplastic substance.

In carrying out the process care should be taken that the amount of thermoplastic substance used is sufficient to produce an excess pressure in the mould in order to ensure an unobjectionable union of the individual particles of thermoplastic substance.

The preparation of the gas-containing thermoplastic masses which are to be foamed up in comminuted form into porous shaped articles may be carried out by various methods. For example mixtures of thermoplastic substance and raising agent may be heated in closed moulds, if desired under pressure, to a temperature above the softening point of the thermoplastic substance and above the decomposition temperature of the raising agent, and comminuted after cooling. It is also possible to treat melts of thermoplastic substances with indifferent gases under high pressure, allow them to cool and comminute them. It is also possible to mix comminuted thermoplastic substances with liquefied or solidified gases, as for example liquid air or solid carbon dioxide, and to heat the mixtures in pressure moulds, the gas-containing thermoplastic masses being comminuted after cooling.

Practically all synthetic thermoplastic substances are suitable for carrying out the process, in particular polyvinyl compounds, as for example polystyrene, polyvinyl chloride, polyvinylidene chloride, polyvinyl carbazole, polyvinyl esters of organic acids, polyacrylic acid and polymethacrylic acid compounds and also interpolymers of the said vinyl derivatives, and also polyamides, polyurethanes and other thermoplastic polycondensation products. As raising agents there may be used for example bicarbonates, azo compounds or hydrazine compounds. The gas content of the thermoplastic masses may be adapted to requirements by selection of the amount of raising agent added. Various kinds of additional substances, such as dyestuffs, softening agents, pigments, non-combustible substances or substances yielding non-combustible gases when they burn, and the like may be incorporated with the thermoplastic masses.

In foaming up the gas-containing particles of thermoplastic substance regard must be had to the nature of the thermoplastic substance in question. Thus for example in the working up of gas-containing polystyrene particles, the foaming up process may be carried out especially advantageously in hot water or steam at temperatures higher than 100° C. to 140° C. or in glycerine heated to about 100° C. to 130° C. or also by heating with infra red rays or hot air. The foaming up of gas-containing particles on the basis of polyamides is preferably effected in hot hydrocarbons.

The specific gravity of the proportion-retaining shaped articles obtained may vary within wide limits. Generally speaking it is possible to prepare porous shaped articles having a specific gravity of 0.6 to 0.02 and even less. The porous shaped articles can be mechanically worked, as for example by sawing, turning and the like. They may be employed in a great variety of fields and in particular as insulating materials in the heating and refrigeration industries, as cork substitutes in general, as floats, substitutes for wood, light materials of all kinds, as toys, as for example animal figures, dolls, dolls' heads, as insulating material in the electrical industry, in particular for the production of material foamed up in the form of bands which can be employed for covering wires, for packings, for the preparations of bottle stoppers, crown cork discs, packing plates, parts of lifebelts, swimming belts, boats and parts of boats, diaphragms, shoes and parts of shoes, wall boards, floor coverings, table plates, packing cases and other packing receptacles, lamp shades and other shaped articles which are distinguished by a very low specific gravity in conjunction with a relatively high strength.

The following examples will further illustrate this invention but the invention is not restricted to these examples. The parts are by weight.

*Example 1*

850 parts of polystyrene are finely ground with 150 parts of ammonium bicarbonate in a ball mill and the mixture introduced into a gas-tight cylindrical mould which is closed at both ends by a screwed cover and heated to 180° C. After heating for an hour, the whole is cooled to 25° C. and the gas-containing solid body removed from the mould and comminuted by grinding in a cross-beater mill to grain size. 30 grams of the comminuted material are introduced into an iron negative mould for a doll having a volume of 150 cubic centimetres which is perforated at several places or is provided with air holes, dipped into water at 95° C. for 45 minutes and then cooled. A doll having a specific gravity of 0.2 is obtained which is very resistant to shock, true to shape and form-retaining.

Example 2

Grained polystyrene is introduced into an open vessel which in turn is introduced into a pressure vessel and therein exposed at 200° C. to the action of nitrogen under a pressure of 500 atmospheres for 150 minutes. The whole is then cooled and the solid article obtained is comminuted. 200 grams of this comminuted, gas-containing polystyrene are then introduced into a mould of the dimensions 500 x 400 x 100 millimetres which is provided with perforations at suitable places. It is then treated for 2 hours with steam at 110° C. and cooled. A proportion-retaining porous plate having a specific gravity of 0.1 is obtained.

Example 3

850 parts of polymethacrylic acid methyl ester and 150 parts of azodiisobutyric acid dinitrile are finely ground in a ball mill. The mixture is then heated for 2 hours at 180° C. in a gas-tight pressure mould without the employment of external pressure. It is allowed to cool and a homogeneous solid article is removed and comminuted by grinding. 100 grams of this comminuted material are introduced into a closable ball mould having a volume of 1000 cubic centimetres and exposed to the action of steam at 110° C. for 60 minutes. After cooling and removal from the mould there is obtained a spherical porous shaped article having a specific gravity of 0.1.

Figure 2:
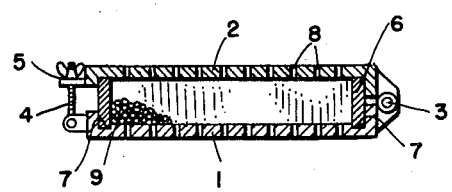
Figure 3:
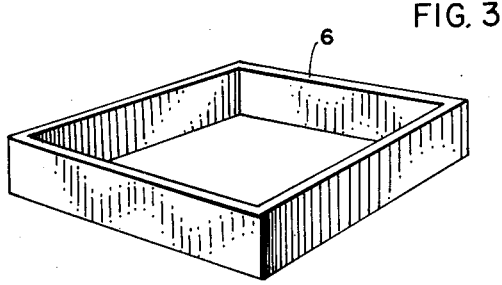

The drawing illustrates the method of the invention wherein comminuted synthetic thermoplastic substances which contain gases under pressure are heated and expanded in moulds and in contact with a hot fluid, as described above, to form porous articles having the shapes of the moulds. In the drawing, Figure 1 is a plan view of the body of a plate mould in open position;

Figure 2 is a vertical sectional view of the mould in closed position, containing comminuted material to be expanded; and Figure 3 is a perspective view of the frame of the mould, which together with the body of Figure 1 constitutes the mould.

The body of the mould includes two metal plates 1 and 2 connected by hinge joints 3, for opening and closing the mould. A lock fastener 4 which is a wing nut and bolt combination pivotally connected to one plate 1 is provided for engagement with a recessed lock plate 5 projecting from the other plate 2, to lock the mould in closed position. Prior to closing, a frame 6 is inserted in a recess 7 provided in one plate 1, and the body is closed to secure the frame tightly between the plates 1 and 2. In the embodiment illustrated, a number of perforations 8 are provided in the plates 1 and 2, for entry of a fluid heat carrier.

In producing a porous article, a plate in the apparatus shown, a comminuted synthetic thermoplastic substance 9 containing a gas under pressure is charged to the mould when open, incompletely filling it, and the mould is closed, as illustrated in Figure 2. An amount of thermoplastic material is employed which will produce an excess pressure on the mould upon expansion, to insure a good union of the individual particles in the resulting shaped article. The closed mould containing the thermoplastic material is immersed in a hot fluid, such as water, steam, glycerine and so forth as described above, to heat the material above its softening point. The gas under pressure contained therein then causes the particles to expand or foam up and fill the mould, rapidly forming a porous article. The mould is then cooled and opened, and the resulting shaped article is removed. It is true to the size and shape of the mould, having a good proportion-retentivity.

What I claim is:

1. A process for the production of porous shaped articles which are true to shape and size from synthetic thermoplastic substances which comprises heating small particles of a synthetic thermoplastic substance containing gases under pressure within the confines of the particles in a closed mold which permits the escape of gases but retains said thermoplastic substance to a temperature above the softening point of the thermoplastic substance, to expand said particles, the proportion of said particles in said mold and said heating being sufficient to fill the mold with expanded cohered particles of said thermoplastic substance, and cooling the expanded thermoplastic substance, thereby obtaining a porous article of said thermoplastic substance having the desired shape and size.

2. A process as claimed in claim 1 in which the particles of said thermoplastic substance are obtained by mixing a thermoplastic substance with a gas generating composition capable of decomposing on heating with the formation of a gas, heating the resultant mixture in a gas tight closed mold to a temperature above the decomposition temperature of the gas generating composition and above the softening point of the thermoplastic substance, cooling under pressure and comminuting the resultant thermoplastic substance containing a gas within the confines of the particles.

3. A process as claimed in claim 1 in which said particles are obtained by melting said thermoplastic substance in the presence of an indifferent gas under pressure, thereafter cooling under pressure and comminuting the gas containing thermoplastic substance.

4. A process for the production of porous shaped articles which are true to shape and size from polystyrene which comprises heating polystyrene in the form of small particles containing a gas under pressure within the confines of the particles in a closed mold which permits the escape of gases but retains said polystyrene to temperatures above the softening point of the polystyrene to expand said particles, the proportion of said particles in said mold and said heating being sufficient to fill the mold with expanded cohered polystyrene particles, and cooling the expanded polystyrene, thereby obtaining a porous article of polystyrene having the desired shape and size.

5. A process as claimed in claim 1 in which the thermoplastic substance is a polymethacrylic acid methyl ester.

6. A process as claimed in claim 1 in which the thermoplastic substance within said mold is heated by contacting it with a liquid in which the thermoplastic is insoluble, said liquid being heated to temperatures above the softening point of the thermoplastic substance.

7. A process as claimed in claim 1 in which said thermoplastic substance is heated by contacting it with steam through perforations in said mold.

References Cited in the file of this patent

UNITED STATES PATENTS

| | | |
|---|---|---|
| 1,534,654 | Netz et al. | Apr. 21, 1925 |
| 2,200,847 | Madge et al. | May 14, 1940 |
| 2,268,160 | Miles | Dec. 30, 1941 |
| 2,363,051 | Dosmann | Nov. 21, 1944 |
| 2,409,910 | Stober | Oct. 22, 1946 |
| 2,447,055 | Cooper | Aug. 17, 1948 |
| 2,524,039 | Carpentier | Oct. 3, 1950 |
| 2,525,880 | Feldman | Oct. 17, 1950 |
| 2,531,665 | Booth | Nov. 28, 1950 |
| 2,602,193 | Korkatti | July 8, 1952 |
| 2,681,321 | Stastny et al. | June 15, 1954 |